United States Patent
Hoover et al.

(10) Patent No.: US 12,344,382 B2
(45) Date of Patent: Jul. 1, 2025

(54) MECHANICAL SHAFT LOCKING MECHANISM WITH BACK-DRIVE PREVENTION

(71) Applicant: AMI Industries, Inc., Colorado Springs, CO (US)

(72) Inventors: Douglas E. Hoover, Colorado Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 799 days.

(21) Appl. No.: 17/184,075

(22) Filed: Feb. 24, 2021

(65) Prior Publication Data

US 2021/0269160 A1 Sep. 2, 2021

Related U.S. Application Data

(60) Provisional application No. 62/982,338, filed on Feb. 27, 2020.

(51) Int. Cl.
*B64D 11/06* (2006.01)
*F16D 63/00* (2006.01)
*G05G 1/02* (2006.01)
*G05G 5/05* (2006.01)

(52) U.S. Cl.
CPC ........ *B64D 11/0644* (2014.12); *F16D 63/006* (2013.01); *F16D 63/008* (2013.01); *G05G 1/02* (2013.01); *G05G 5/05* (2013.01); *G05G 2505/00* (2013.01)

(58) Field of Classification Search
CPC . B64D 11/0644; F16D 63/006; F16D 63/008; F16H 2035/005; F16H 35/00; B60N 2/763

See application file for complete search history.

(56) References Cited

U.S. PATENT DOCUMENTS

| | | | |
|---|---|---|---|
| 3,368,433 A * | 2/1968 | Roberts | B23Q 5/406 82/136 |
| 4,155,268 A | 5/1979 | Lee et al. | |
| 4,884,914 A | 12/1989 | Shultz | |
| 9,353,808 B2 * | 5/2016 | Ferguson | F16D 49/00 |
| 10,099,577 B2 * | 10/2018 | Runde | B60N 2/067 |
| 2005/0242649 A1 * | 11/2005 | Himmelhuber | B60N 2/767 297/411.38 |
| 2016/0230862 A1 | 8/2016 | Hoover | |

FOREIGN PATENT DOCUMENTS

| | | | | |
|---|---|---|---|---|
| EP | 1975063 A2 * | 10/2008 | | B64D 11/06 |
| EP | 2602189 A1 * | 6/2013 | | B60N 2/233 |
| GB | 2553080 A * | 2/2018 | | B62B 1/12 |

OTHER PUBLICATIONS

EP Search Report for European Application No. 21160022.6 dated Sep. 14, 2021, 14 pages.

* cited by examiner

*Primary Examiner* — David R Dunn
*Assistant Examiner* — Tania Abraham
(74) *Attorney, Agent, or Firm* — Suiter Swantz IP

(57) ABSTRACT

A locking mechanism to prevent back-drive includes a locking shaft with guide grooves. Locking shaft guides engage the guide grooves to constrain lateral motion of the locking shaft. A nut includes corresponding grooves to the locking shaft, and engages the locking shaft to prevent linear translation. The locking mechanism may be incorporated into a aircraft seat armrest to create a positive lock in the armrest position.

15 Claims, 16 Drawing Sheets

US 12,344,382 B2

MECHANICAL SHAFT LOCKING MECHANISM WITH BACK-DRIVE PREVENTION

PRIORITY

The present application claims the benefit under 35 U.S.C. § 119 (e) of U.S. Provisional App. No. 62/982,338 (filed Feb. 27, 2020), which is incorporated herein by reference.

BACKGROUND

Existing adjustable aircraft armrests have either a limited number of possible orientations (deployed or stowed), or some mechanism for retaining the armrest in specific desired orientation. Mechanisms for "infinite adjustability" are either cumbersome and time consuming such as turning a threaded rod, or unstable with significant back-drive (applied forces push the adjusting element back from its desired position). Back-drive puts the armrest in a slightly undesirable orientation leading to fatigue. It would be desirable to a have a fast, positively locking adjustment mechanism that does not back-drive.

SUMMARY

In one aspect, embodiments of the inventive concepts disclosed herein are directed to a locking mechanism to prevent back-drive. The locking mechanism includes a locking shaft with guide grooves. Locking shaft guides engage the guide grooves to constrain lateral motion of the locking shaft. A nut includes corresponding grooves to the locking shaft, and engages the locking shaft to prevent linear translation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
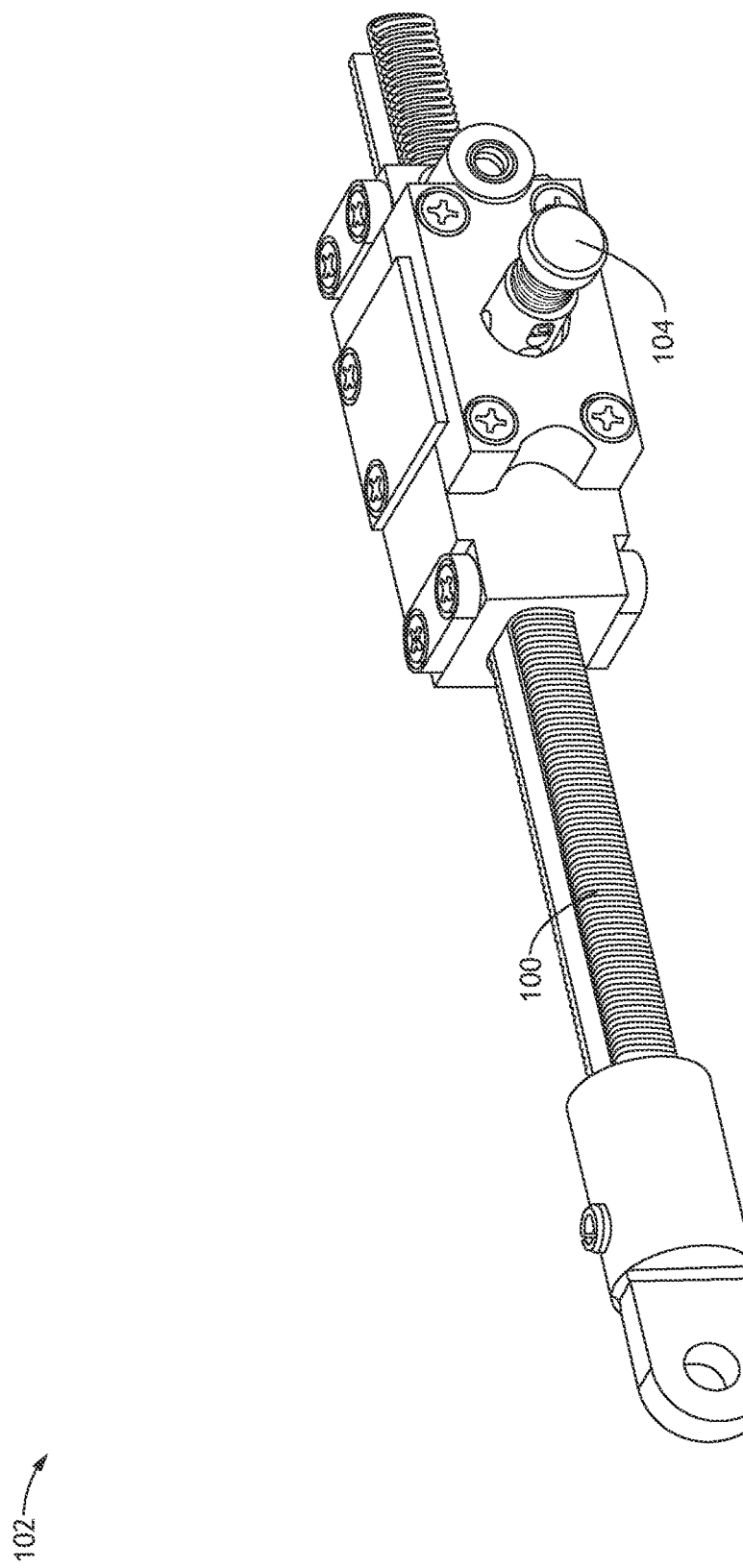
FIG. 1A shows a perspective view of an exemplary embodiment of a locking mechanism with back-drive prevention.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a locking mechanism to prevent back-drive. The locking mechanism includes a locking shaft with guide grooves. Locking shaft guides engage the guide grooves to constrain lateral motion of the locking shaft. A nut includes corresponding grooves to the locking shaft, and engages the locking shaft to prevent linear translation.

Figure 1B:
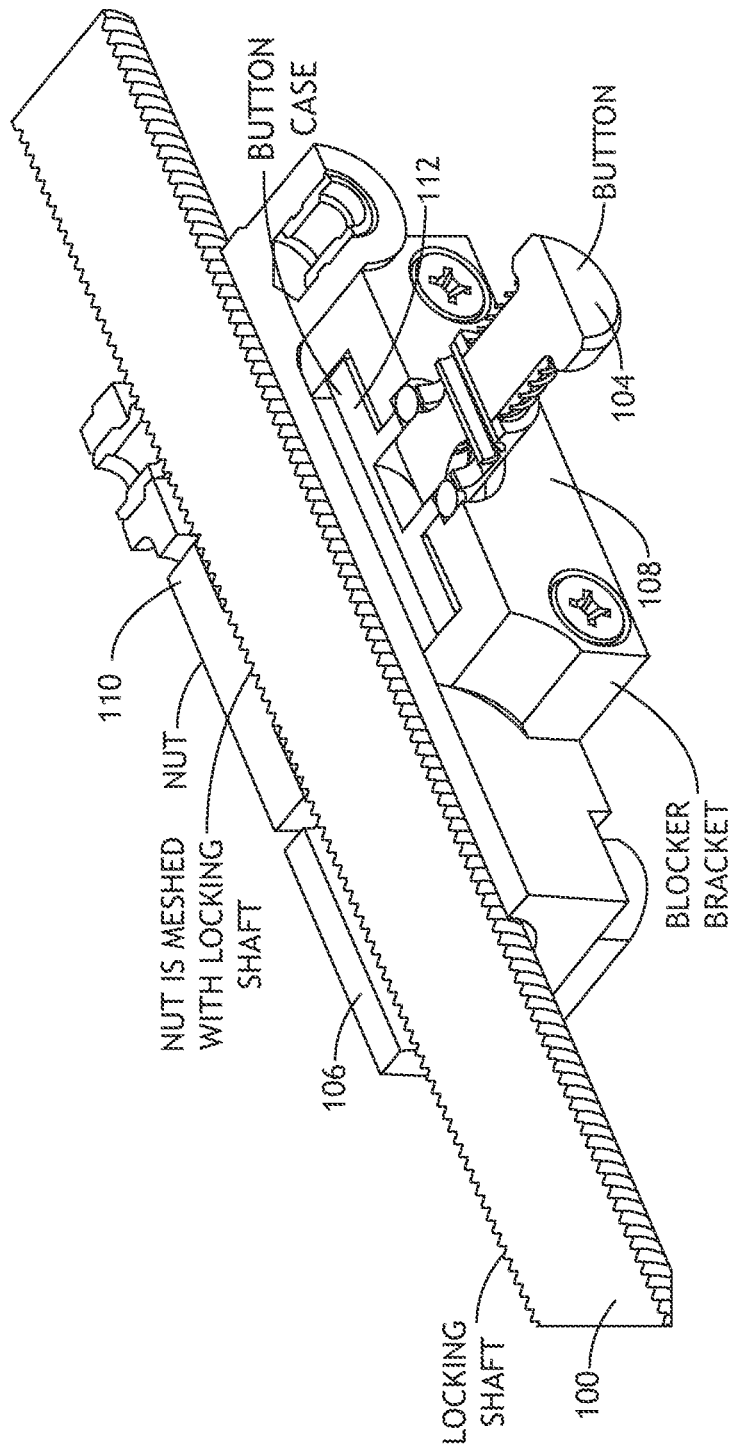
FIG. 1B shows a detail, cross-sectional, perspective view of an exemplary embodiment of a locking mechanism with back-drive prevention.
Figure 1C:
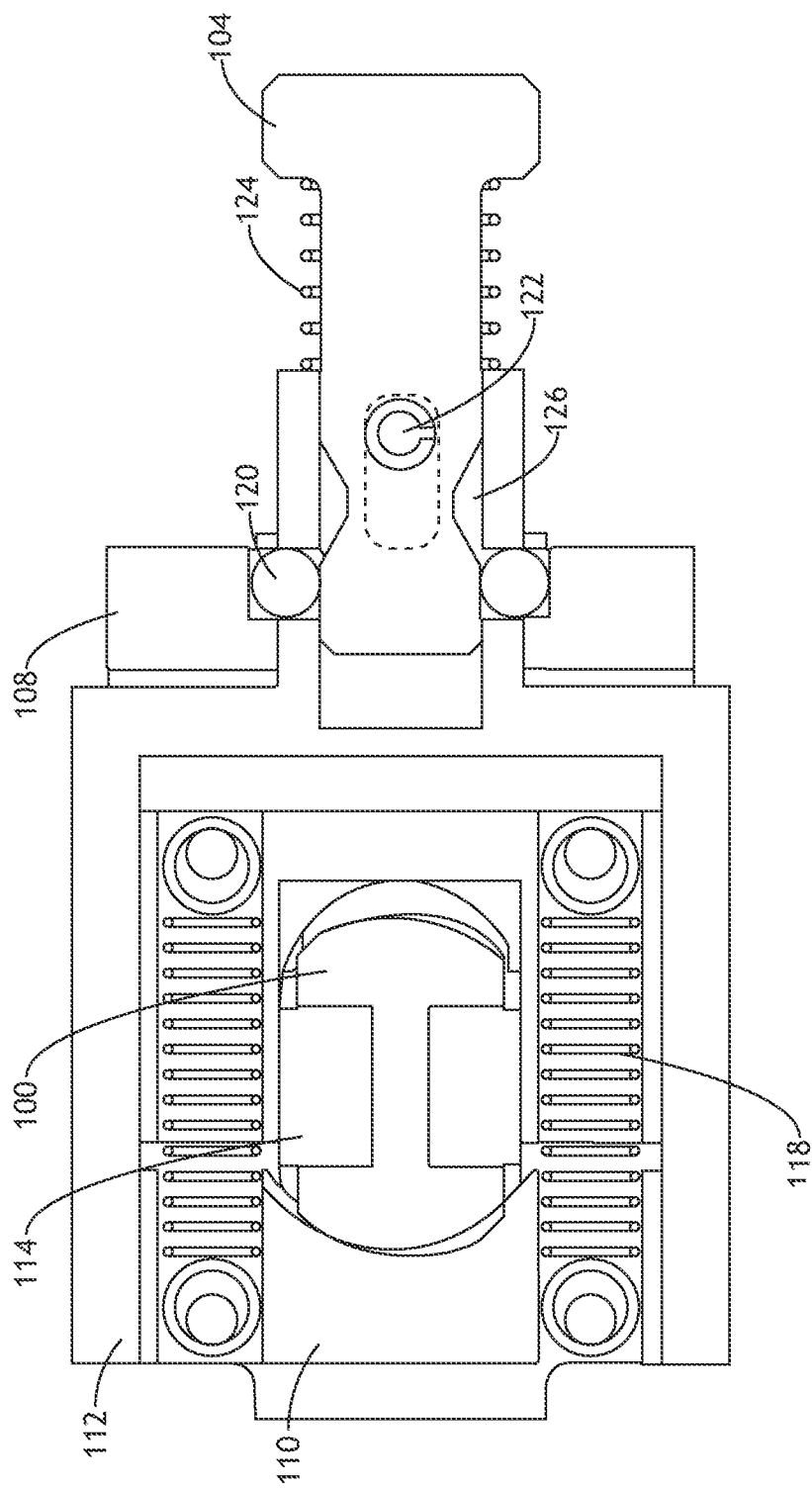
FIG. 1C shows a detail, cross-sectional, side view of an exemplary embodiment of a locking mechanism with back-drive prevention.
Figure 1D:
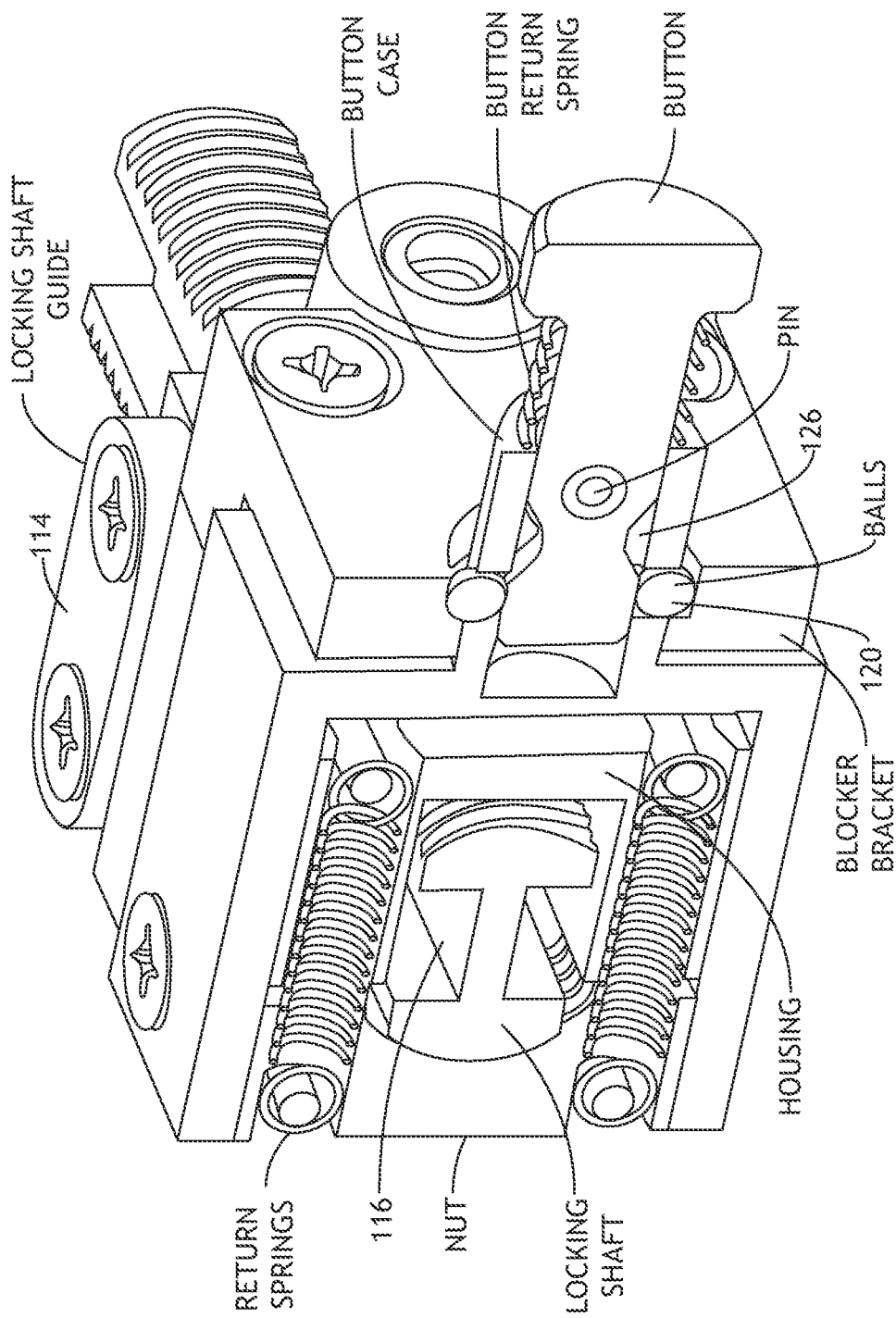
FIG. 1D shows a detail, cross-sectional, perspective view of an exemplary embodiment of a locking mechanism with back-drive prevention.

Referring to FIGS. 1A-1D, perspective, detail, and cross-sectional views of an exemplary embodiment of a locking mechanism with back-drive prevention in a locked state are shown. A locking shaft 100 having a threaded surface is configured to translate linearly within a locking mechanism 102 that may be disengaged via a button 104 as more fully described herein. In at least one embodiment, the locking mechanism 102 comprises a housing 106 that defines a channel of travel for the locking shaft 100. A blocker bracket 108 connected to the housing 106 defines an area of travel for the button 104 and contains the mechanisms corresponding to the button 104 as more fully described herein. A nut 110 having a threaded surface (obscured) is configured to translate within a opening of the housing 106 such that the threaded surface of the nut 110 may engage and disengage from the threaded surface of the locking shaft 100. In at least one embodiment, a button housing 112 is connected to the nut 110. The button housing 112 may be disposed around the housing 106 such that a force applied to the button 104 displaces the button housing 112 and moves the nut 110. For example, the button housing 112 may be constrained by the blocker bracket 108, and when the button 104 is pushed toward the locking shaft 100, the button housing 112 is displaced within the blocker bracket 108 a distance sufficient to disengage the threaded portion of the nut 110 from the threaded portion of the locking shaft 100.

In at least one embodiment, one or more locking shaft guides 114 engage corresponding guide channels 116 defined by the locking shaft 100. In at least one embodiment, locking shaft guides 114 are disposed at each end of the housing 106 along the channel of travel to define a linear path for the locking shaft, and constrain the locking shaft 100 to that linear path. Furthermore, locking shaft guides 116 may be disposed on opposing sides of the housing 106 as well to minimize any lateral movement and retain the locking shaft 100 where the threaded portion of the nut 110 may engage the threaded portion of the locking shaft 100.

In at least one embodiment, one or more biasing elements 118 bias the housing 106 and the nut 110 toward a locking configuration where the threaded portion of the nut 110 engages the threaded portion of the locking shaft 100. The one or more biasing elements 118 may comprise springs, and may be connected between the housing 106 and the nut 110, or between the housing 106 and the button housing 112 as the button housing 112 is affixed to the nut 110.

In at least one embedment, the button housing 112 is maintained in a locking configuration by one or more ball stops 120. The ball stops 120 protrude through corresponding ball stop channels defined by the button housing into ball stop engaging features defined by the blocker bracket. When the button 104 is not being pressed (when in a locked configuration), the button 104 is biased by a button return spring 124 to an orientation wherein a large diameter portion of the button 104 forces the ball stops 120 to protrude through the ball stop channels in to the ball stop engaging features. Pushing the button (unlocking), translates the button 104 such that a small diameter portion 126 of the button 104 coincides with the ball stops 120, and the ball stops 120 can disengage from the ball stop engaging features. The button housing 112 is thereby unlocked, though the nut 110 may still engage the locking shaft 100. Releasing the button 104 causes the button return spring 124 to push the button 104 out, in a path defined by a pin 122. In conjunction with the biasing elements 118 that tend to translate the button housing 112, the shape of the small diameter portion of the button 104 pushes the ball stops 120 to protrude form the ball stop channels into the ball stop engaging features and relock the button housing 112.

It may be appreciated that the ball stops 120 prevent the nut 110 from translating when a linear force is applied to the locking shaft 100. Such linear force could, in some circumstances, cause the nut 110 to translate due to the interaction of the threaded portion of the nut 110 and the threaded portion of the locking shaft 100.

Figure 2A:
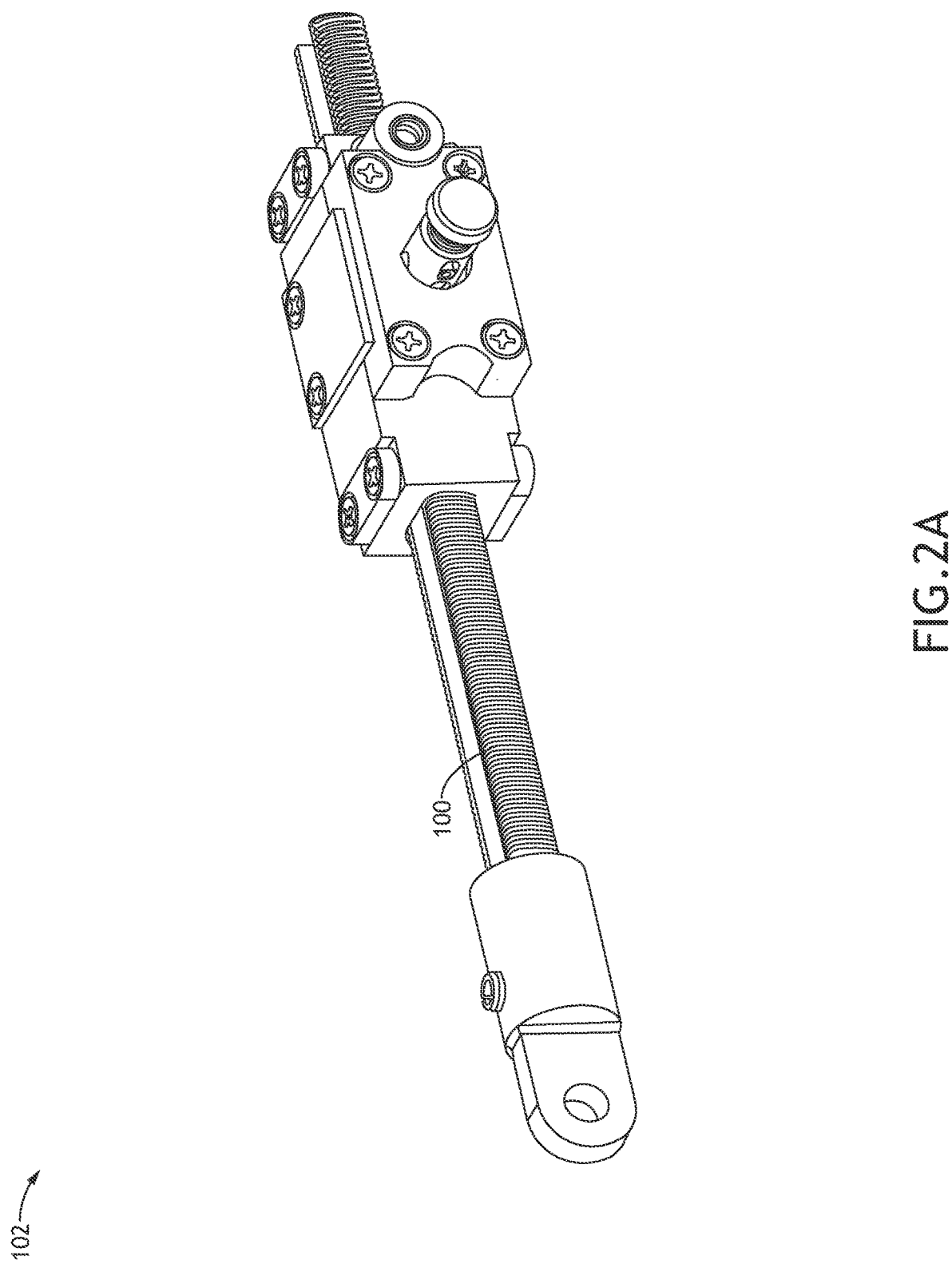
FIG. 2A shows a perspective view of an exemplary embodiment of a locking mechanism with back-drive prevention.
Figure 2B:
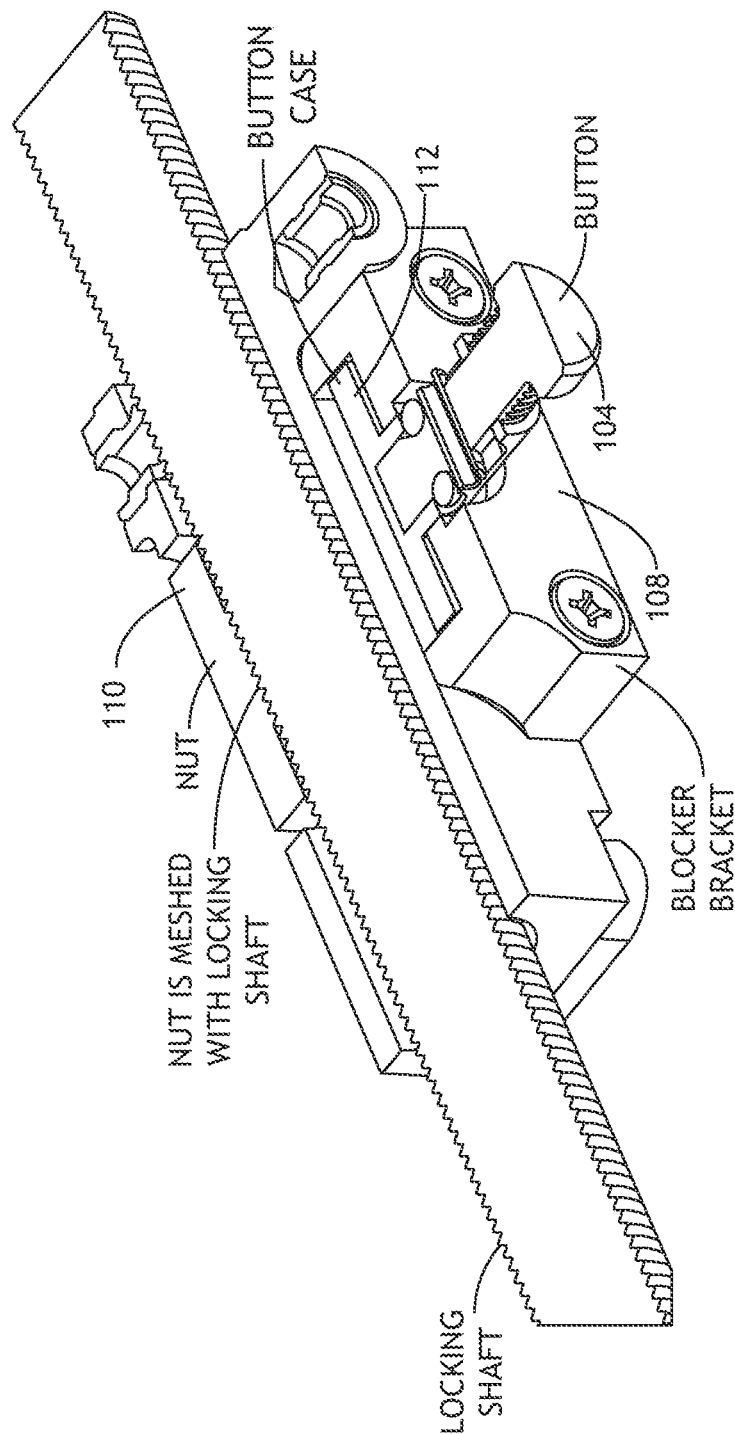
FIG. 2B shows a detail, cross-sectional, perspective view of an exemplary embodiment of a locking mechanism with back-drive prevention.
Figure 2C:
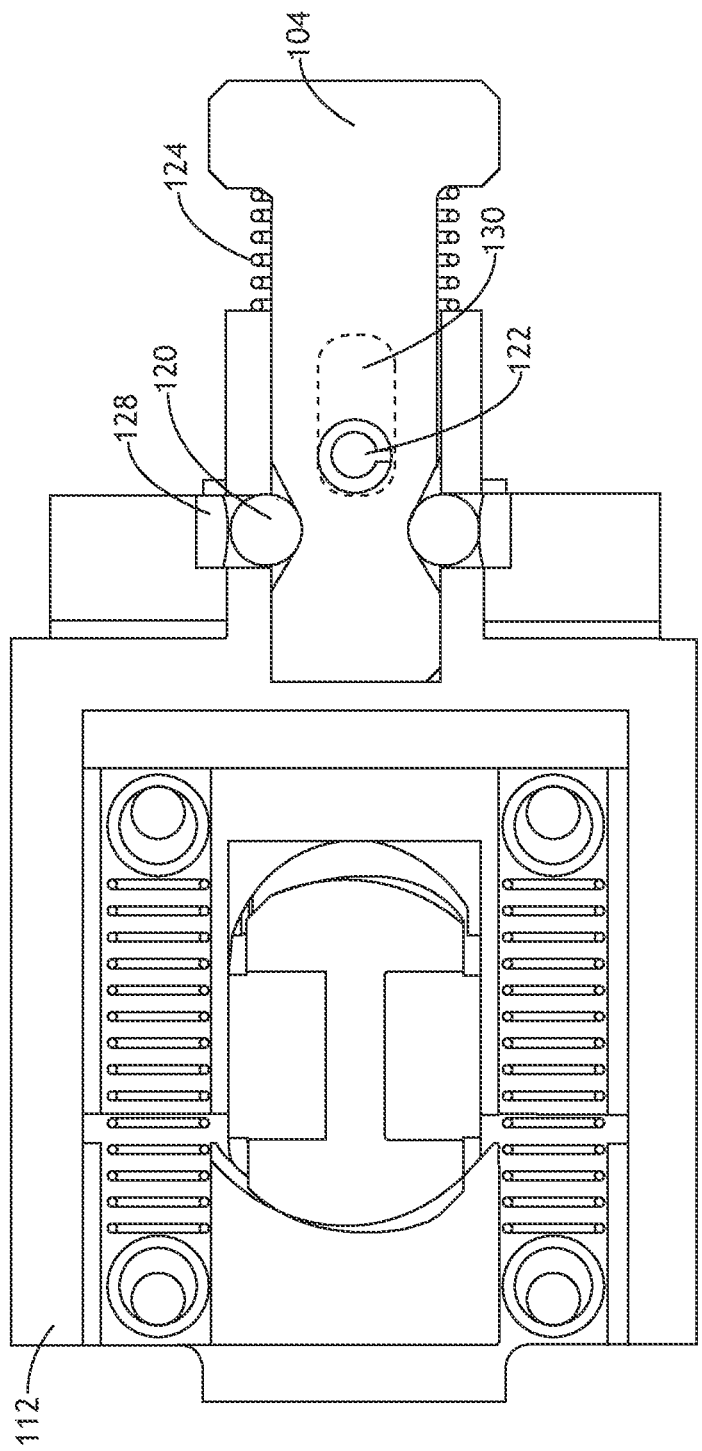
FIG. 2C shows a detail, cross-sectional, side view of an exemplary embodiment of a locking mechanism with back-drive prevention.
Figure 2D:
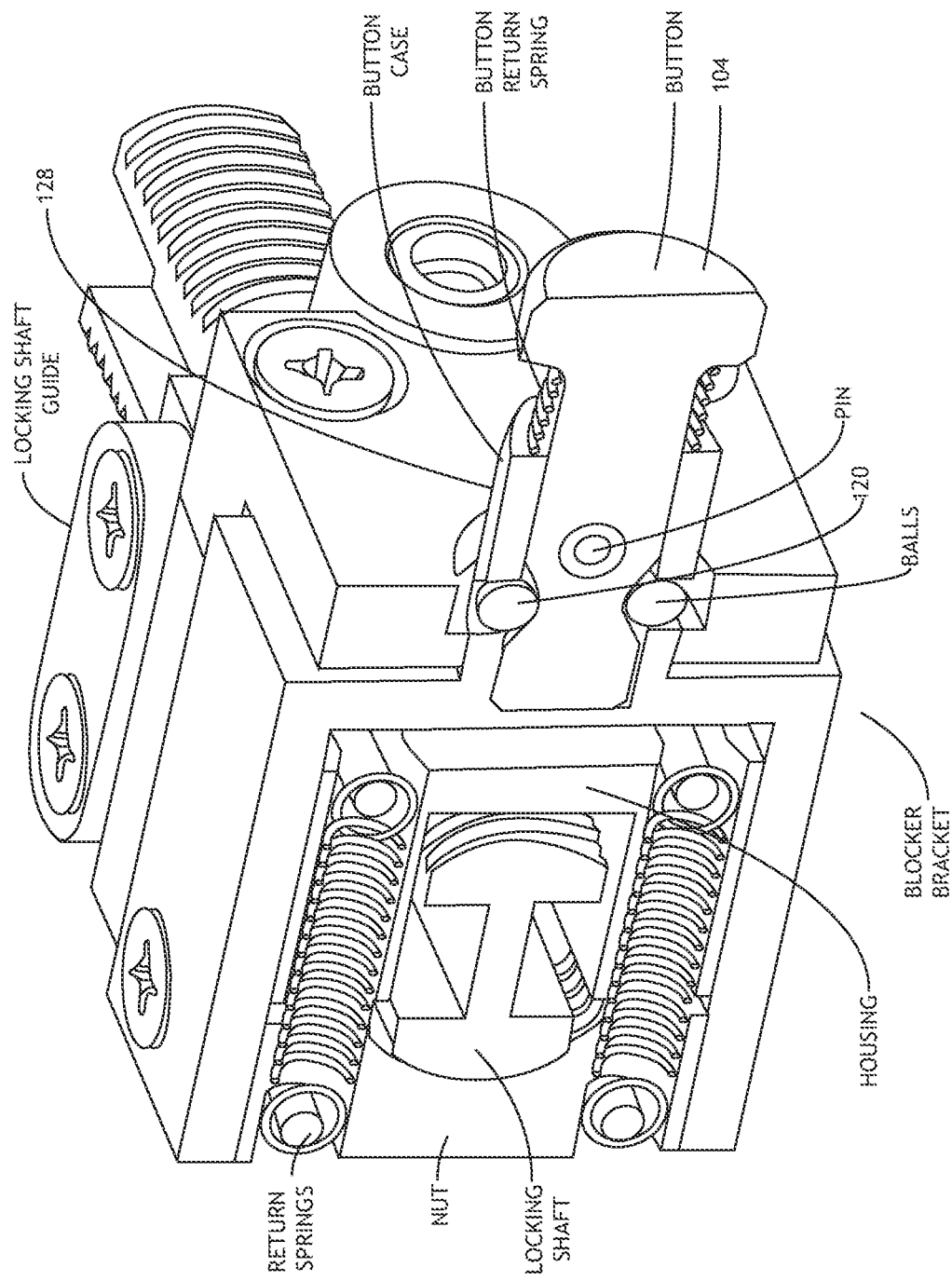
FIG. 2D shows a detail, cross-sectional, perspective view of an exemplary embodiment of a locking mechanism with back-drive prevention.

Referring to FIGS. 2A-2D, perspective, detail, and cross-sectional views of an exemplary embodiment of a locking mechanism with back-drive prevention in a partially unlocked state are shown. In a partially unlocked configuration (the button housing is unlocked), pushing the button, translates the button 104 such that the small diameter portion 126 of the button 104 coincides with the ball stops 120. The ball stops 120 may be forced to disengage from the ball stop engaging features 128 via the interaction of the ball stop engaging features 128 and the round surface of the ball stops 120. The button 104 may include a pin 122 configured to slide within a slot 130 defined by the button housing 112 to define a maximum protrusion of the button 104; alternatively, the button 104 may define the slot 130 and the pin 126 may disposed through the slot 130 into the button housing 112. The button housing 112 is thereby unlocked such that it may translate. The button 104, when fully depressed, abuts a surface of the button housing 112 within a button shaft defined by the button housing 112. Further depression of the button 104 will cause the button housing 112 to translate.

Figure 3A:
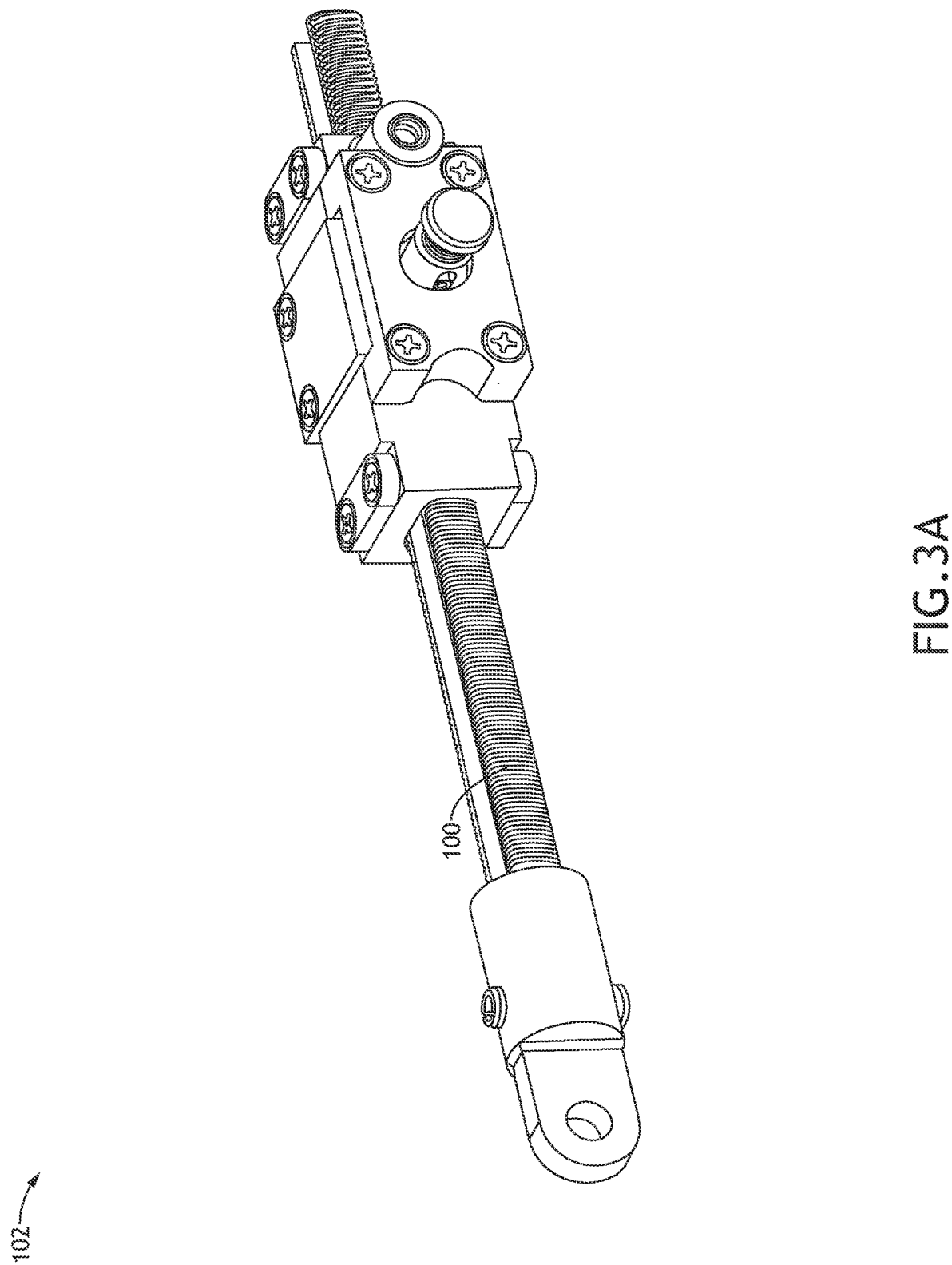
FIG. 3A shows a perspective view of an exemplary embodiment of a locking mechanism with back-drive prevention.
Figure 3B:
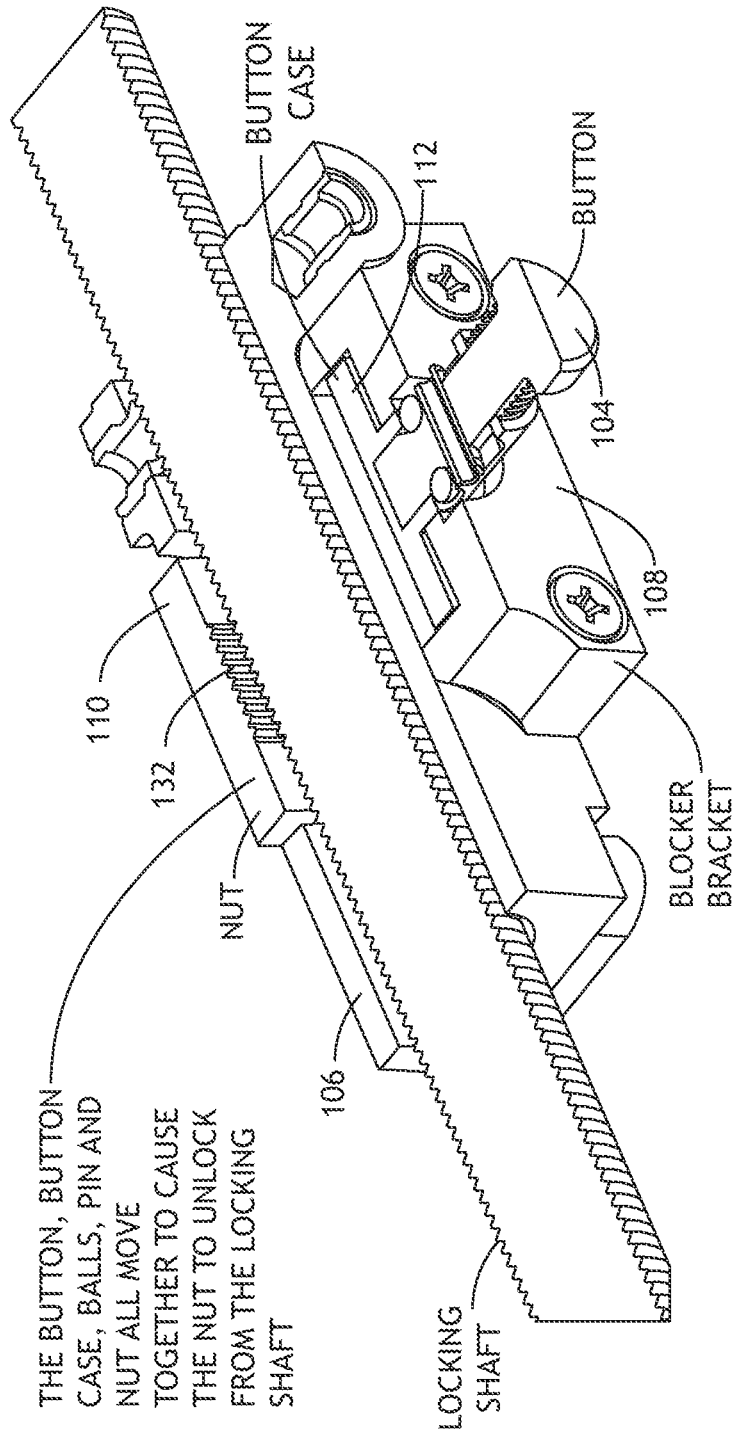
FIG. 3B shows a detail, cross-sectional, perspective view of an exemplary embodiment of a locking mechanism with back-drive prevention.
Figure 3C:
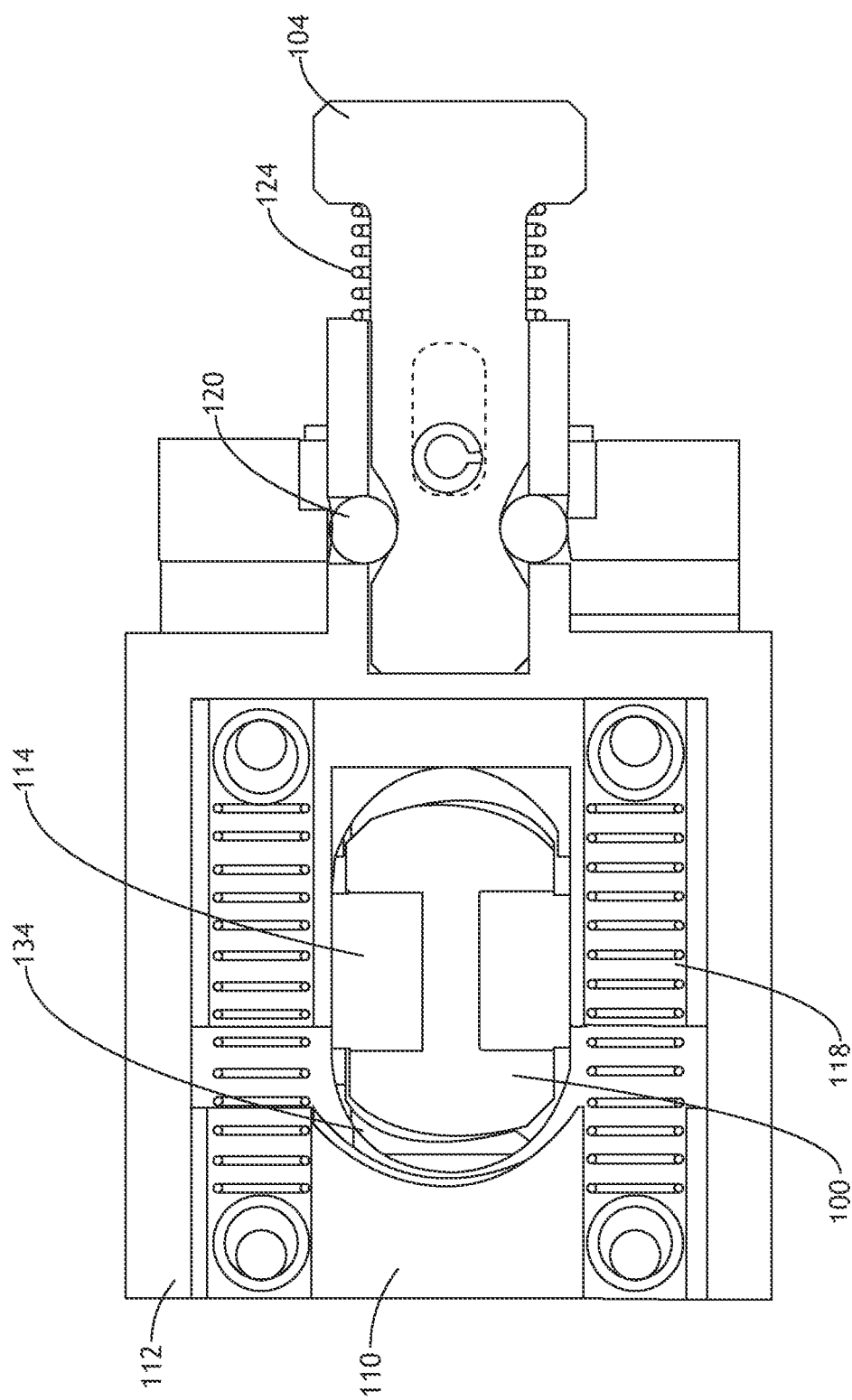
FIG. 3C shows a detail, cross-sectional, side view of an exemplary embodiment of a locking mechanism with back-drive prevention.
Figure 3D:
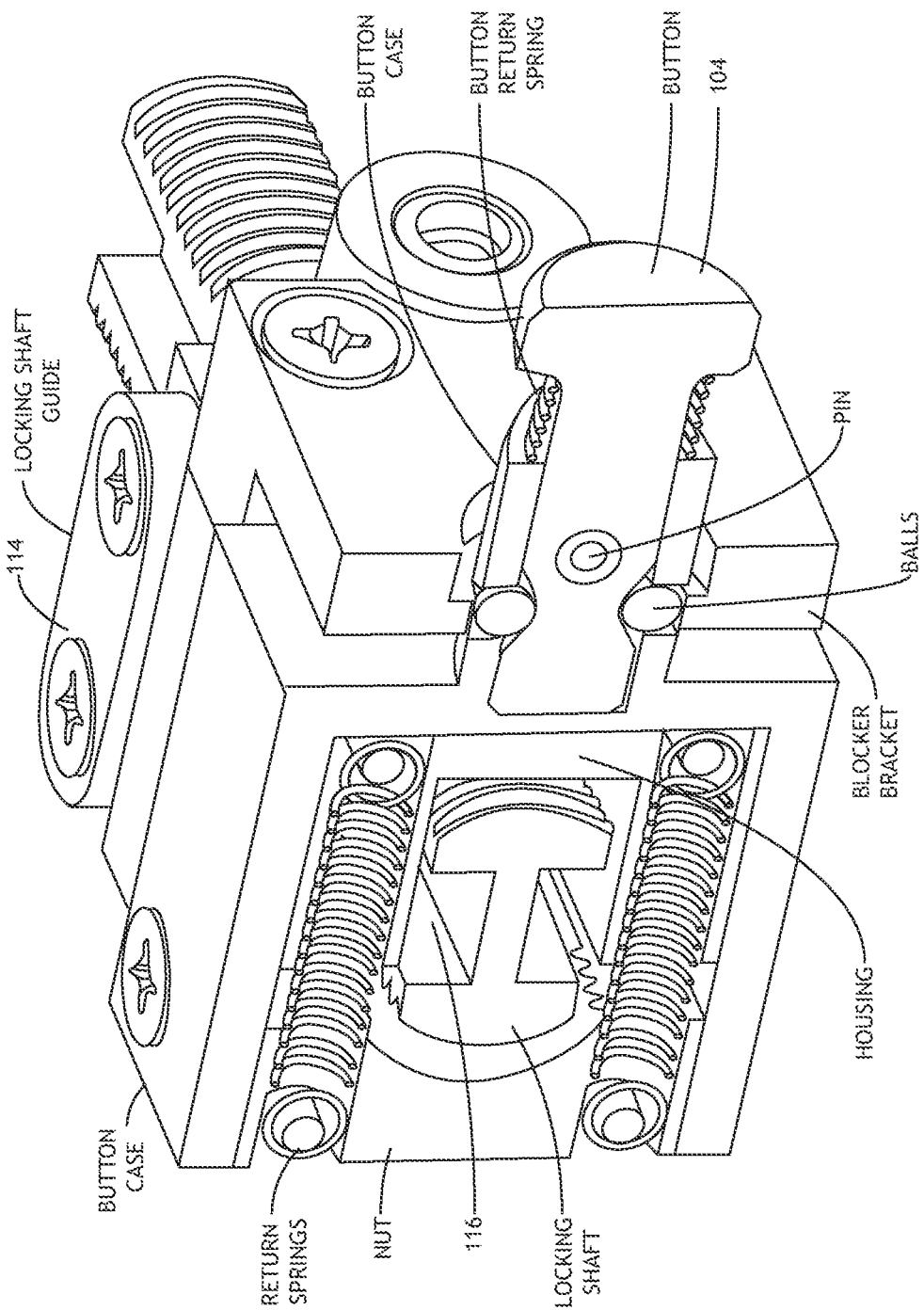
FIG. 3D shows a detail, cross-sectional, perspective view of an exemplary embodiment of a locking mechanism with back-drive prevention.

Referring to FIGS. 3A-3D, perspective, detail, and cross-sectional views of an exemplary embodiment of a locking mechanism with back-drive prevention in an unlocked state are shown. In an unlocked configuration, where the button 104 is fully depressed such that the button housing 112 is fully translated, the nut 110 is also translated to disengage the threaded portion 132 of the nut 110 from the threaded portion of the locking shaft 100. A gap 134 between the nut 110 and locking shaft 110 allows the locking shaft to freely move within the housing 106 along a path defined by the locking shaft guides 114 and corresponding guide channels 116.

The biasing elements 118 tend to force the threaded portion 132 of the nut 110 to reengage the threaded portion of the locking shaft 100, so releasing the button 104, even partially, tends to lock the locking shaft 100 at the current location. Partially releasing the button 104 does not tend to lock the button housing 112; when the button 104 is fully released, the button return spring 124 causes the ball stops 120 to reengage and lock the button housing 112.

Figure 4A:
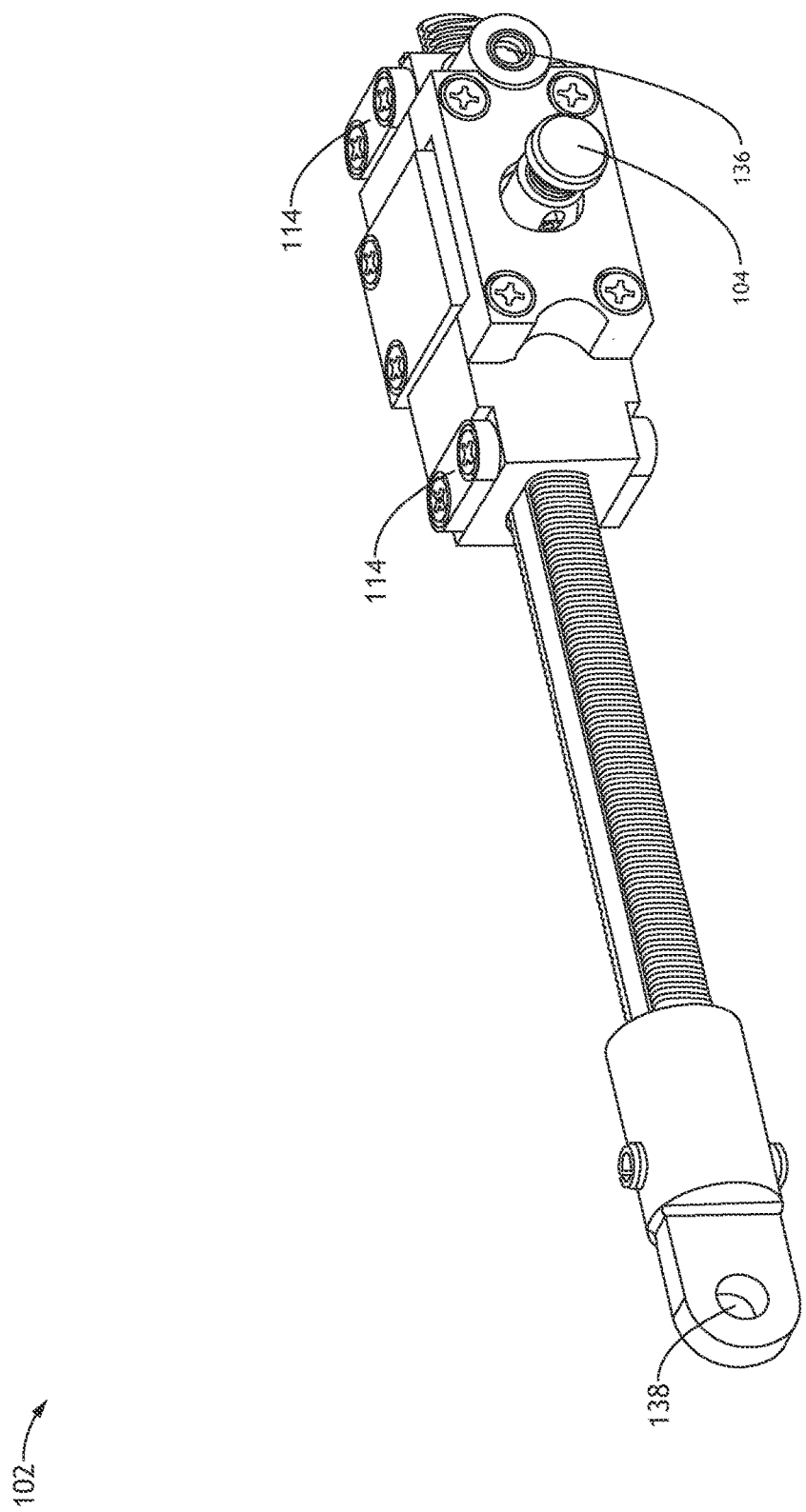
FIG. 4A shows a perspective view of an exemplary embodiment of a locking mechanism with back-drive prevention.
Figure 4B:
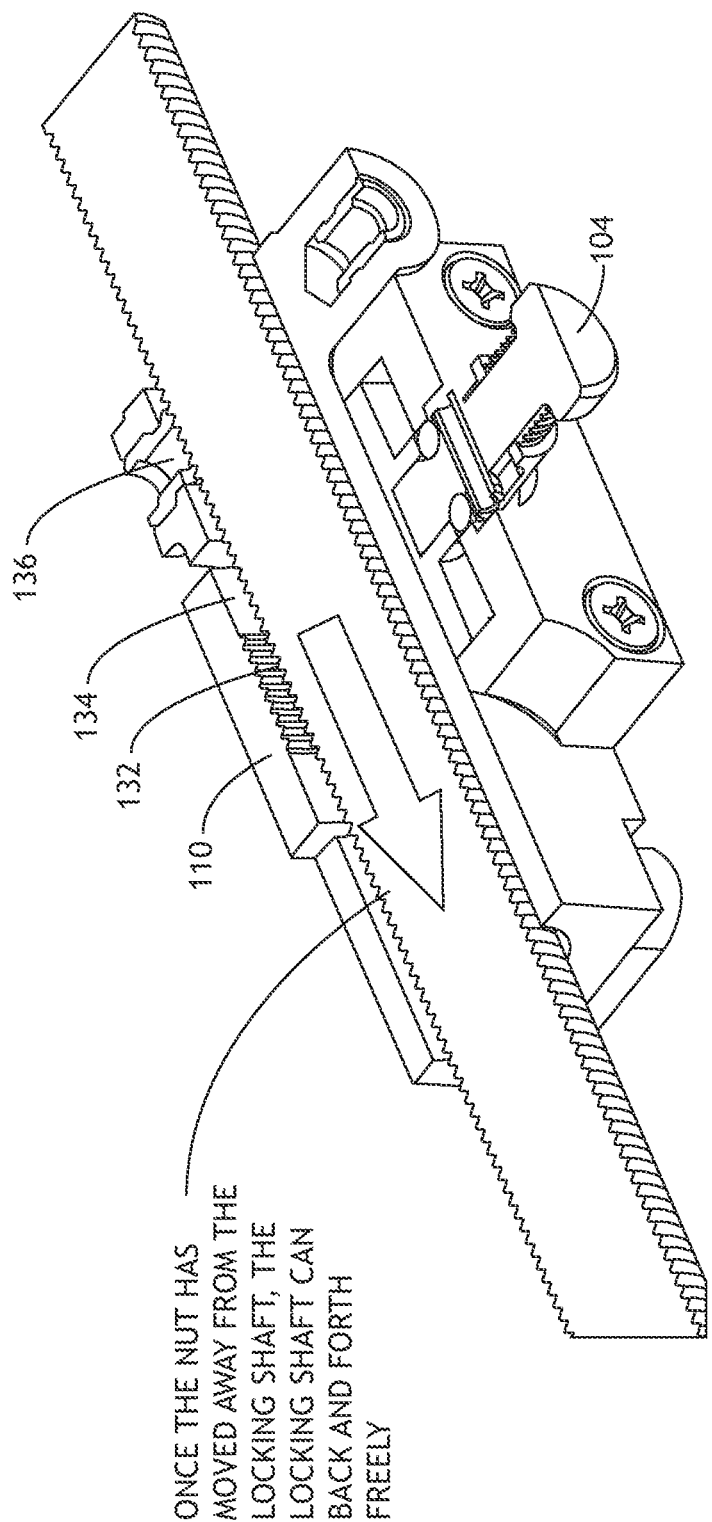
FIG. 4B shows a detail, cross-sectional, perspective view of an exemplary embodiment of a locking mechanism with back-drive prevention.
Figure 4C:
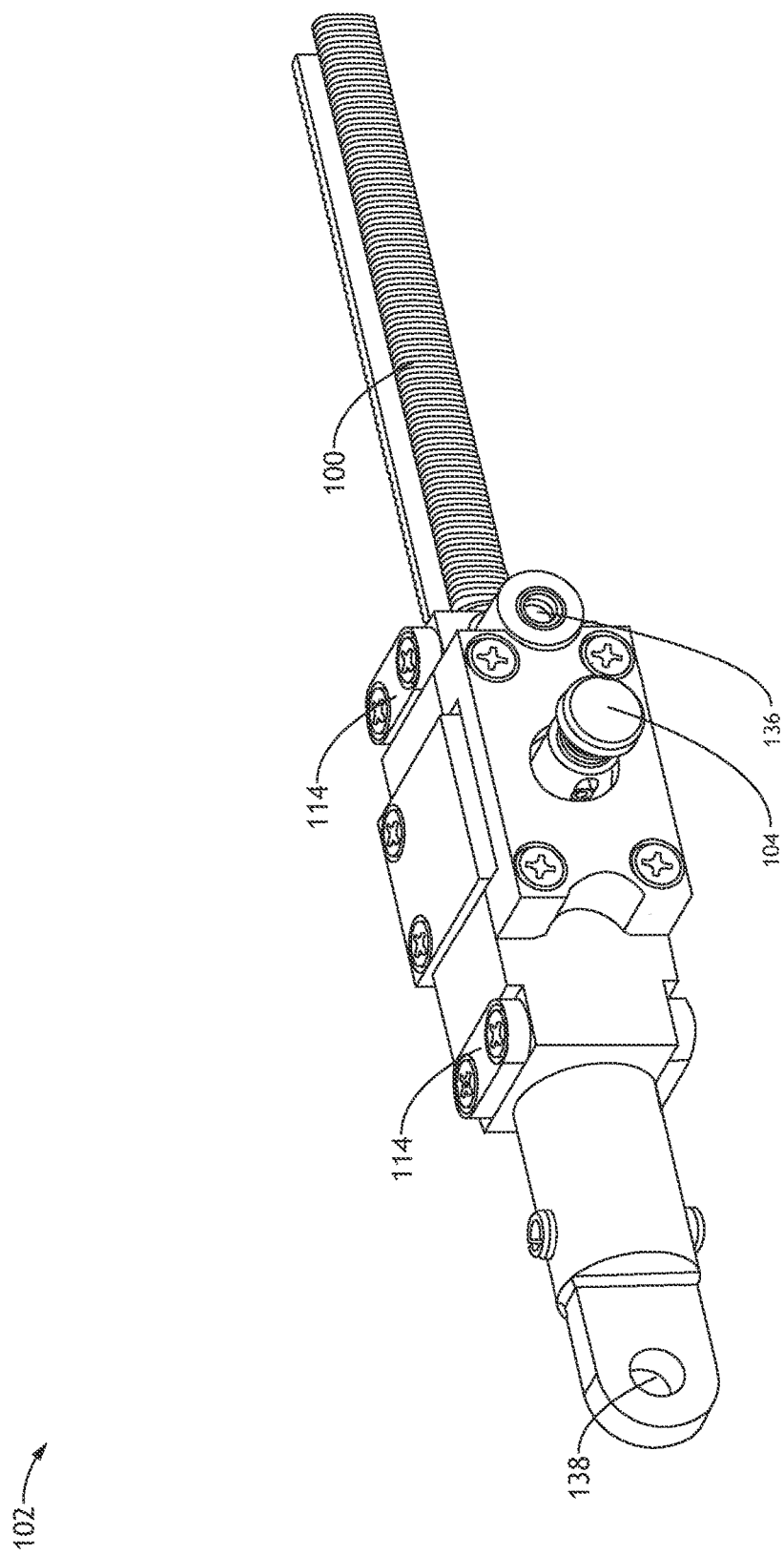
FIG. 4C shows a perspective view of an exemplary embodiment of a locking mechanism with back-drive prevention.
Figure 4D:
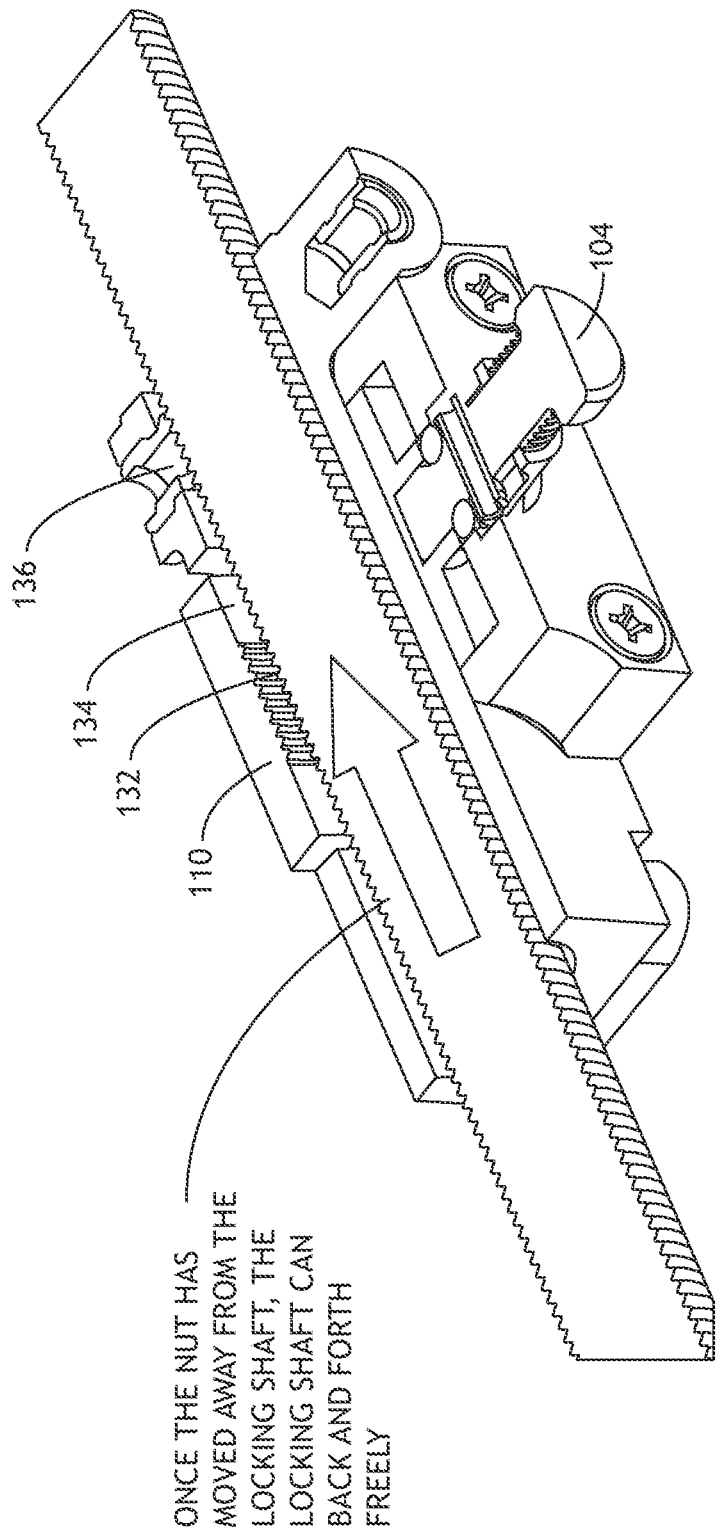
FIG. 4D shows a detail, cross-sectional, perspective view of an exemplary embodiment of a locking mechanism with back-drive prevention.

Referring to FIGS. 4A-4D, a perspective and detail cross-sectional views of an exemplary embodiment of a locking mechanism with back-drive prevention in various states of translation are shown. A locking shaft 100 and locking mechanism 102 as described herein may be incorporated into any system where lockable, controlled translation is desirable. For example, in an aircraft armrest, a pilot may wish to set the translation of the armrest to coincide with the controls of the aircraft. In that case, the locking shaft 100 may include an attachment feature 138 to affix the locking shaft 100 to a first portion of the armrest while the locking mechanism 102 includes an attachment feature 136 to affix the locking mechanism 102 to a second portion of the armrest.

When the locking mechanism 102 is disengaged via the button 104, a gap 134 between the threaded portion 132 of the nut 110 and the threaded portion of the locking shaft 100 allows the connected portions of the armrest to translate freely along the path defined by the locking shaft guides 114. Releasing the button 104 locks the connected portions of the armrest relative to each other for substantially infinite adjustability.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A mechanical shaft locking apparatus comprising:
a locking shaft having a threaded surface;
a nut having a threaded surface corresponding to the threaded surface of the locking shaft;
a housing defining a locking shaft channel and an opening to receive the nut; and
at least two biasing elements configured to bias the threaded surface of the nut toward the threaded surface of the locking shaft, at least two of the at least two biasing elements disposed on opposing sides of the locking shaft,
wherein the nut is configured to translate linearly along an axis perpendicular to the locking shaft when a corresponding button is depressed.

2. The mechanical shaft locking apparatus of claim 1, further comprising one or more locking shaft guides, each configured to engage a guide channel, wherein the locking shaft defines at least one guide channel.

3. The mechanical shaft locking apparatus of claim 2, wherein the one or more locking shaft guides comprise at least two locking shaft guides disposed at opposing ends of the housing.

4. The mechanical shaft locking apparatus of claim 3, wherein:
the one or more locking shaft guides comprise four locking shaft guides disposed at opposing ends of the housing, and on opposite sides of the housing; and
the locking shaft defines two guide channels disposed on opposing sides of the locking shaft.

5. The mechanical shaft locking apparatus of claim 1, further comprising:
a button housing defining one or more ball stop channels in a button shaft;
the button configured to translate in the button shaft, the button defining a large diameter portion and a small diameter portion; and
one or more ball stops disposed in corresponding ball stop channels,
wherein:
in a locked configuration, the large diameter portion disposes the ball stops to protrude from the ball stop channels; and
in an unlocked configuration, the small diameter portion disposes the ball stops to be completely within the button housing.

6. The mechanical shaft locking apparatus of claim 5, wherein:
the button housing is affixed to the nut; and
the button is configured to apply a force to the button housing and translate the nut to disengage the threaded surface of the nut from the threaded surface of the locking shaft.

7. The mechanical shaft locking apparatus of claim 5, further comprising a blocker bracket defining one or more ball stop engaging features, wherein:
in the locked configuration, the ball stops protrude into the ball stop engaging features to prevent translation of the button housing; and
in the unlocked configuration, the ball stops disengage from ball stop engaging features to allow translation of the button housing.

8. An aircraft seat armrest comprising:
a mechanical shaft locking apparatus comprising:
a locking shaft having a threaded surface;
a nut having a threaded surface corresponding to the threaded surface of the locking shaft;
a housing defining a locking shaft channel and an opening to receive the nut; and
at least two biasing elements configured to bias the threaded surface of the nut toward the threaded surface of the locking shaft, at least two of the at least two biasing elements disposed on opposing sides of the locking shaft,
wherein the nut is configured to translate linearly along an axis perpendicular to the locking shaft when a corresponding button is depressed.

9. The aircraft seat armrest of claim 8, further comprising one or more locking shaft guides, each configured to engage a guide channel, wherein the locking shaft defines at least one guide channel.

10. The aircraft seat armrest of claim 9, wherein the one or more locking shaft guides comprise at least two locking shaft guides disposed at opposing ends of the housing.

11. The aircraft seat armrest of claim 10, wherein:
the one or more locking shaft guides comprise four locking shaft guides disposed at opposing ends of the housing, and on opposite sides of the housing; and
the locking shaft defines two guide channels disposed on opposing sides of the locking shaft.

12. The aircraft seat armrest of claim 8, further comprising:
a button housing defining one or more ball stop channels in a button shaft;
the button configured to translate in the button shaft, the button defining a large diameter portion and a small diameter portion; and
one or more ball stops disposed in corresponding ball stop channels,
wherein:
in a locked configuration, the large diameter portion disposes the ball stops to protrude from the ball stop channels; and
in an unlocked configuration, the small diameter portion disposes the ball stops to be completely within the button housing.

13. The aircraft seat armrest of claim 12, wherein:
the button housing is affixed to the nut; and
the button is configured to apply a force to the button housing and translate the nut to disengage the threaded surface of the nut from the threaded surface of the locking shaft.

14. The aircraft seat armrest of claim 12, further comprising a blocker bracket defining one or more ball stop engaging features, wherein:
in the locked configuration, the ball stops protrude into the ball stop engaging features to prevent translation of the button housing; and
in the unlocked configuration, the ball stops disengage from ball stop engaging features to allow translation of the button housing.

15. The aircraft seat armrest of claim 14, wherein:
the locking shaft is affixed to a first portion of the aircraft seat armrest;
the housing is connected to a second portion of the aircraft seat armrest; and
in an unlocked configuration, the first portion of the aircraft seat armrest may translate with respect to the second portion of the aircraft seat armrest.

* * * * *